Dec. 5, 1950     W. G. CHAUSSE     2,532,995
HEATED HOSE
Filed Dec. 1, 1947
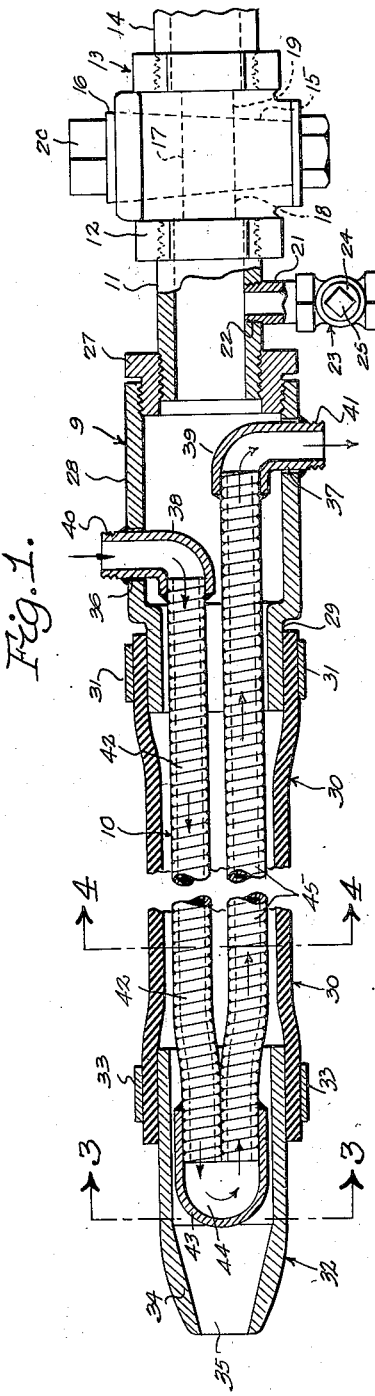
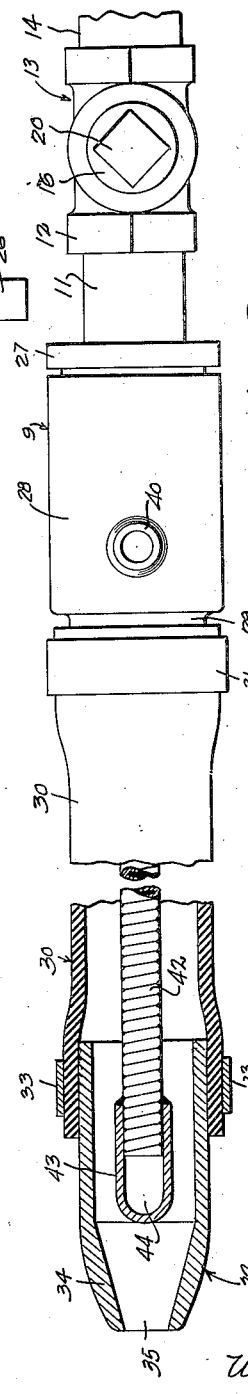
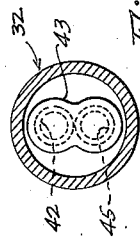
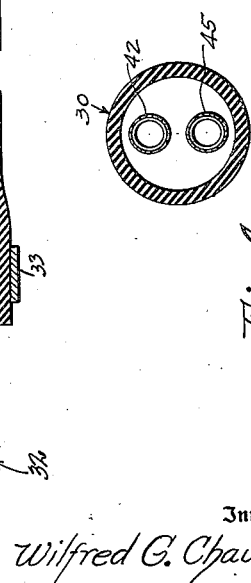
Inventor
Wilfred G. Chausse
By Barthel + Bugbee
Attorneys Patented Dec. 5, 1950

2,532,995

UNITED STATES PATENT OFFICE 2,532,995

HEATED HOSE

Wilfred G. Chausse, Detroit, Mich.

Application December 1, 1947, Serial No. 789,040

2 Claims. (Cl. 257—241)

1

This invention relates to apparatus for handling highly viscous liquids such as the heavy oils, tar, asphalt, bituminous materials and the like used in road building and repairing operations.

One object of this invention is to provide a hose which has means therein for heating the liquid passing through the hose immediately prior to its discharge from the hose.

Another object is to provide a hose having a heating conduit which traverses the interior thereof and is connected to a source of high temperature fluid in order to heat the liquid passing through the hose.

Another object is to provide a hose for handling highly viscous liquids wherein the hose itself is flexible and contains a flexible heating element for heating the liquid passing through the hose, this heating element being constructed and arranged to flex with the hose while heating the contents thereof.

Another object is to provide a heated hose, as set forth in the preceding objects, herein a nozzle is attached to the forward part of the hose and the heating element extends part way into the nozzle.

In the drawings:

Figure 1 is a side elevation, mainly in central vertical longitudinal section, of a heated hose according to a preferred form of the invention;

Figure 2 is a top plan view, partly in central horizontal section of the heated hose shown in Figure 1;

Figure 3 is a vertical cross-section along the line 3—3 in Figure 1, showing the outer end of the heating element at its location within the hose nozzle; and Figure 4 is a vertical cross-section along the line 4—4 in Figure 1 showing another portion of the heating element within the flexible portion of the hose.

Hitherto the handling of highly viscous oils and other liquids, such as road oils, tar, asphalt and similar high melting liquids used in road building and repair work has been very difficult because of the high viscosity of these liquids at ordinary temperatures and the rapidity with which they thicken while they are being used, even though they have been previously heated. Ordinarily such liquids are drawn off into small containers, such as buckets, after they have been heated in a tank, but the liquid soon becomes too viscous for convenient handling if it remained more than a short time in such containers.

2

The present invention solves this problem of delivering high viscous liquids quickly and easily to points of use by providing a heated hose which is connected at one end to the heated tank containing the main supply of the liquid. The opposite end of the hose is provided with a nozzle by which the liquid may be deposited at any desired location. As the hose and the heating element therein are both flexible, the nozzle may be moved over a wide area without necessitating moving the tank. Moreover, the same fluid which is used to heat the tank may also be used to heat the hose, for example, heated oil or steam.

Referring to the drawings in detail, Figure 1 shows a heated hose, generally designated 9, containing a heating element, generally designated 10, according to a preferred form of the invention, as attached to the outlet conduit 11 from a heated liquid tank (not shown). The conduit 11 is threaded into the casing 12 of a valve 13 from the opposite side of which a conduit 14 leads to the heated liquid tank (not shown). The valve 13 contains a conical bore 15 which, in turn, is provided with a conical valve stem member or plug 16 having a transverse passageway 17 which is alignable with the passageways 18 and 19 in the casing 12 when the valve member 16 is turned to its open position, as by the use of a wrench on the squared head 20.

A nipple 21 (Figure 1) is also threaded into the bore 22 in the conduit 11 and, in turn, is threaded into a valve 23, generally similar to the valve 13 but of smaller size and having a similar valve member or plug 24 operated by a wrench upon the square head 25. A conduit 26 is connected to the opposite side of the valve 23. The conduit 21, 26 may be used for the application of steam, compressed air or the like, to clean out the hose 9 or the conduits 11 and 14 and, if necessary, to force the viscous liquid therein back to the tank.

Threaded upon the outer end of the conduit 11 is an internally threaded collar 27 which is also externally threaded to receive the hose connection 28. The latter is roughly cylindrical in form and at its forward end is provided with a reduced diameter portion 29 upon which is mounted the rearward end of a flexible hose 30 which is secured in position by means of a retaining or clamping ring 31. The flexible hose 30 is preferably of rubber or other flexible material and at its opposite end is slipped over the rearward end of a nozzle 32 and clamped in position by a clamping ring 33 similar to the clamping ring 31. The nozzle 32 is provided with a tapered end portion 34 and a tapered outlet passageway 35 for the escape of the liquid.

The heating element 10 used to heat the interior of the hose 30, as well as the hose connection 28 and nozzle 32, is connected to inlet and outlet parts 36 and 37 respectively, containing elbows 38 and 39. These elbows are preferably welded into position and are provided with threaded external portions 40 and 41 respectively for the attachment of other conduits as explained hereinafter.

Secured, as by welding, to the inner end of the elbow 38 is a flexible conduit 42, the opposite end of which is secured, as by welding, to a hollow end member 43. The end member 43 contains an approximately semi-cylindrical chamber or passageway 44 which leads to the outer end of a flexible conduit 45, welded or otherwise secured thereto. The inner end of the conduit 45 is secured as by welding to the inner end of the elbow 39.

In the operation of the invention, the hose connection portion 28 is attached to the conduit 11 by means of the collar 27 and the threaded connections 40 and 41 of the elbows 38 and 39 are connected to heated liquid supply and return conduits (not shown). These conduits lead to a heating liquid heater, such as a heater for heating oil. Alternatively, steam may be admitted at the elbow 38 and discharged at the elbow 39.

Meanwhile, let it be assumed that the high viscosity liquid in the tank has been heated to reduce its viscosity, and that the low viscosity heating fluid is passing through the heating element 10 from the inlet elbow 38 to the outlet elbow 39. As the heating fluid passes through the heating element 10, its heat is transferred through its walls to the high viscosity liquid flowing through the hose 30 from the conduits 11 and 14 leading to the heated tank (not shown). Thus, the approximately U-shaped heating element 10 maintains the contents of the hose 30, hose connection 28 and nozzle 32 in a heated condition so that it flows freely therethrough.

Since the high viscosity fluid is maintained in a heated condition in this manner, its viscosity is very much reduced and it flows easily through the nozzle 32, even in cold weather. Since the hose 30 and heating element 10 are both of flexible construction, the nozzle 32 may be moved from place to place to deposit the oil or other heated liquid at any desired location, without moving the tank truck in which the liquid is carried. This, therefore, eliminates the necessity for carrying containers of the high viscosity liquid any considerable distance, since the nozzle 32 itself may be moved to such location. When the use of heated hose 9 has terminated, it can be cleaned out by admitting steam or compressed air or another heated fluid such as a solvent fluid through the conduits 21 and 26 and by way of the valve 23. Thus, the heated hose 9 may be cleaned out without permitting the liquid to solidify within its interior, thereby keeping the heated hose 9 in readiness for its next period of use.

What I claim is:

1. A heated hose construction comprising a pair of spaced tubular members, a hose joined at its opposite ends to said tubular members, and an elongated approximately U-shaped flexible heating conduit extending from one of said tubular members toward the other tubular member within said hose substantially throughout the length thereof and back to the first-mentioned tubular member, said conduit having couplings joined thereto for connection to an external source of heating fluid, one of said tubular members having a nozzle portion at the outer end thereof, said heating conduit extending into the interior of said nozzle portion.

2. A heated hose construction comprising a tubular casing, an elongated flexible hose connected at one end to said casing, a tubular nozzle connected to the other end of said hose, an elongated flexible heating conduit extending through the interior of said hose substantially throughout the length thereof into said nozzle, and couplings joined to the opposite ends of said conduit and extending through the walls of said casing for connection to an external source of heating fluid.

WILFRED G. CHAUSSE.

REFERENCES CITED

The following references are of record in the file of this patent:

UNITED STATES PATENTS

| Number | Name | Date |
|---|---|---|
| 787,356 | Collins et al. | Apr. 18, 1905 |
| 1,457,634 | Neri | June 5, 1923 |
| 1,575,152 | Battista | Mar. 2, 1926 |
| 1,706,052 | Auchincloss | Mar. 19, 1929 |
| 1,727,692 | Beyer | Sept. 10, 1929 |
| 2,250,325 | Barnes | July 22, 1941 |
| 2,294,038 | Kucher | Aug. 25, 1942 |
| 2,452,367 | Gangloff | Oct. 26, 1948 |